US006782687B1

(12) United States Patent
Mingers

(10) Patent No.: US 6,782,687 B1
(45) Date of Patent: Aug. 31, 2004

(54) ROLLER CHAIN

(75) Inventor: Konrad Mingers, Korschenbroich (DE)

(73) Assignee: A. Monforts Textilmaschinen GmbH & Co., Mönchengladbach (DE)

( * ) Notice: Subject to any disclaimer, the term of this patent is extended or adjusted under 35 U.S.C. 154(b) by 225 days.

(21) Appl. No.: 10/048,187

(22) PCT Filed: Aug. 16, 2000

(86) PCT No.: PCT/DE00/02808
§ 371 (c)(1),
(2), (4) Date: Jan. 25, 2002

(87) PCT Pub. No.: WO01/16420
PCT Pub. Date: Mar. 8, 2001

(30) Foreign Application Priority Data

Aug. 31, 1999 (DE) .......................... 199 41 306

(51) Int. Cl.[7] .............................. D06C 3/02; F16G 13/12
(52) U.S. Cl. .................... 59/4; 59/78; 59/84; 474/209; 474/231; 198/850
(58) Field of Search ................... 59/78, 84, 4; 474/209, 474/231; 198/850

(56) References Cited

U.S. PATENT DOCUMENTS

| 2,049,941 | A | * | 8/1936 | Kjaer | 474/231 |
| 2,241,820 | A | * | 5/1941 | Kohn | 474/209 |
| 4,620,844 | A | * | 11/1986 | Greene et al. | 474/209 |
| 5,077,965 | A | * | 1/1992 | Jedamzik | 59/78 |
| 5,459,993 | A | * | 10/1995 | Kuriyama et al. | 59/4 |
| 5,468,376 | A | * | 11/1995 | Bates | 59/84 |

FOREIGN PATENT DOCUMENTS

| DE | 3529683 | * | 2/1987 |
| DE | 35 29 683 | | 2/1987 |
| DE | 39 13 933 | | 10/1990 |
| DE | 3913933 | * | 10/1990 |
| EP | 400375 | * | 5/1990 |
| EP | 0 400 375 | | 12/1990 |

* cited by examiner

Primary Examiner—David B. Jones
(74) Attorney, Agent, or Firm—Collard & Roe, P.C.

(57) ABSTRACT

A roller chain for moving a web of textile material in a tenter frame. The roller chain has inner members flexibly joined to outer members in an alternating manner with a sleeve and a bolt. A running roller having an inner ring; an outer ring and sealing rings forming a ball bearing assembly is mounted on the sleeve. The sealing rings substantially seal ball bearings enclosed in the running roller. The sealing ring has a spacing element consisting of individual metallic inserts distributed approximately equally around a circumference of the sealing ring. The spacing element transmits axial force applied to an inner tab of an inner member to an inner ring of the running roller. The sealing ring has a lubrication groove formed thereon in fluid communication with a lubrication hole on a sleeve and a lubrication channel in an interior of the bolt for lubricating the ball bearing.

11 Claims, 2 Drawing Sheets

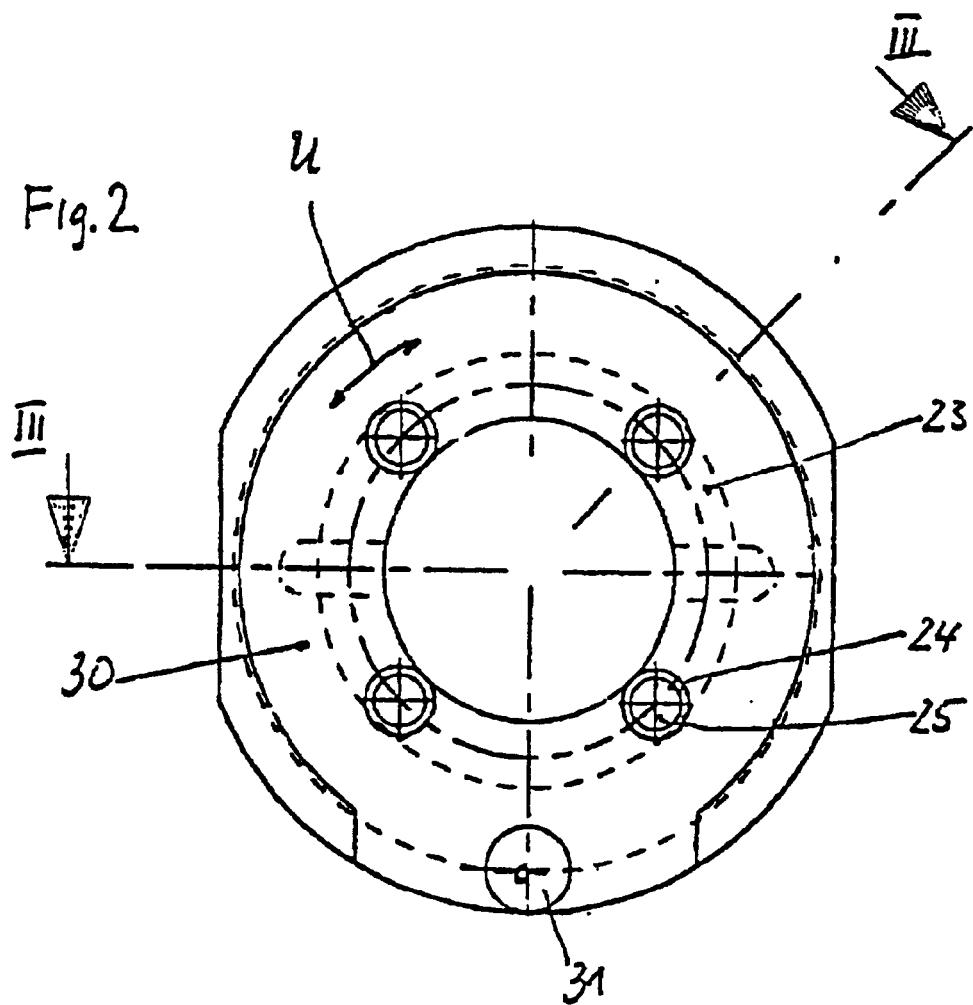
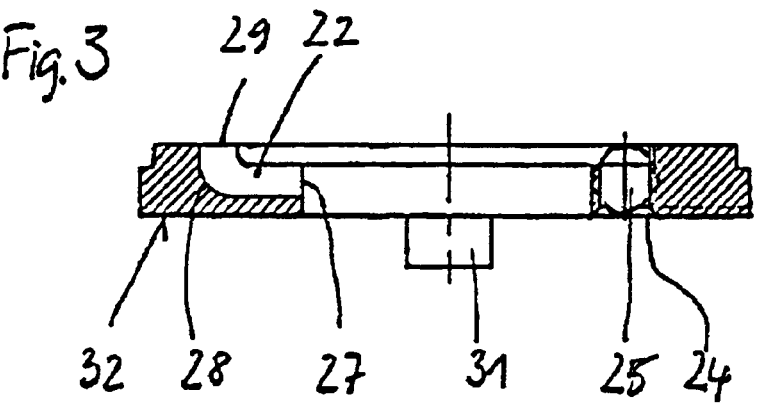

ously arranged, radially starting from the sleeve.
ROLLER CHAIN

Applicant claims priority under 35 U.S.C. §119 of GERMAN Application No. 199 41 306.1 filed Aug. 31, 1999. Applicant also claims priority under 35 U.S.C. §365 PCT/DE00/02808 filed on Aug. 16, 2000. The international application under PCT article 21(2) was not published in English.

BACKGROUND OF THE INVENTION

1. Field of the Invention

The invention relates to a roller chain for continuously guiding and/or stretching the width of a web of textile material on a machine stretching a web of textile material (the so-called tenter). The roller chain comprises inside and outside members which are connected via chain joints in a successively alternating manner, (a) whereby each inside member is comprised of two inner tabs as well as two sleeves connecting the inner tabs with each other, and each outer member is comprised of two outer tabs as well as two bolts connecting the outer tabs with each other;

(b) whereby each sleeve is coaxially mounted and rotatably supported on the associated bolt;

(c) whereby coaxially on the outside on the sleeve, provision is made for a running roller as the outer ring of a ball bearing that is to be supplied with lubricant via a lubrication channel extending through the interior of the bolt;

(d) whereby the ball bearing comprises an inner ring coupled with the sleeve, and located on each end a sealing ring resting coaxially against the ball bearing; and (e) whereby the inner tabs are unmovably pressed onto the sleeve and axially against the inner ring of the ball bearing via a space-keeping element bridging the sealing ring in terms of transmission of force.

2. Prior Art

A roller chain with said features is part of the internal prior art of the applicant firm. The invention in particular relates to a further development of the sealing ring of the roller chain specified in item (d) above.

EP 0 400 375 B2 describes a roller chain in connection with which the lubrication channel for the ball bearing is leading directly into the interior of the ball bearing via an inner tab. In the known art, the lubrication channel is disposed about parallel with the axis of the bolt outside of said axis. Such a structure simplifies the re-lubrication of the chain because the channel of the lubricant for re-lubricating the ball bearing follows a substantially straight course from the point of lubrication where the lubricant is injected into the channel, up to the actual bearing. However, the point of lubrication where the lubricant is injected on the outer side of the respective inner tab is located near the bolt. The outer tab is axially seated on the bolt outside of the inner tab. In some chain constructions, the free end of the outer tab projects far (in the longitudinal direction of the chain) beyond the inner tab to such an extent that the area available for placing the point lubrication for injecting the lubricant is substantially covered by the outer tab. For re-lubrication, the outer tab would then have to be either shortened or provided with a drilled hole. Such an expenditure is not justifiable, as a rule.

Conventional lubrication channels are used for the lubricant, if need be, for example such as the lubricant channels described in DE 35 29 683 A1. According to said patent, the ball bearings of the chain links are lubricated from the interior of each bolt. For this purpose, provision is made in each chain bolt for an axial longitudinal bore with a radial branch leading to the ball bearing. The sleeve and the inner ring of the ball bearing have an opening located in a site which, when the bearing is lubricated, has to be brought to coincide with the radial branch mentioned above. This means that the radial branch of the longitudinal bore of the bolt and the channel leading through the sleeve have to be aligned with one another. If the sleeve is connected with the associated pair of inner tabs in a fixed manner, and the bolt is connected in a fixed manner with the adjacent pair of outer tabs, such a passage channel can be provided in terms of construction in a manner such that, for example in connection with a chain stretching in a straight line, the bores and the passages are aligned from the point of lubrication where the lubricant is injected, up to the interior of the ball bearing.

In connection with modern roller chains of the type specified above, the tabs, which have a bore located at each longitudinal end, are pressed with their bores onto the associated sleeve in the direction of the ball bearing, and riveted to the sleeve, if need be. In such a pressing process, the force is directly transmitted to the inner ring of the ball bearing located adjacent to the sleeve. If a sealing ring has to be mounted on the interior space of the ball bearing containing the balls and the lubricating grease, a ring made of metal, for example such as bronze or steel, is inserted in practical applications between the axial longitudinal end of the inner ring of the ball bearing and the inner tab. Such a ring, which functions as a space-keeping element, creates the force-free space for accommodating the sealing ring. In such an embodiment, the spacer ring and the sealing ring are thus successively arranged, radially starting from the sleeve. The spacer ring serves the purpose of transmitting to the inner ring of the ball bearing the axial forces occurring when the inner tab is pressed over and riveted to the sleeve. One purpose of the sealing ring is to substantially protect the interior of the ball baring against any unintended loss of lubricant.

If, with a chain construction of the type described above that comprises inner tabs riveted to the respective sleeves, one wanted to extend the lubrication channel starting from the interior of the ball bearing up into the interior of the ball bearing, the lubrication channel would have to extend through the spacer ring, which means gaps would be required in the ring accordingly. The dimensions that could be considered possible in such a case would require a division of the spacer ring. However, it is difficult when the sleeve and the inner tab are joined by pressing and riveting to bring a gap provided in the spacer ring in exact coincidence with a lubricant bore provided in the sleeve.

SUMMARY OF THE INVENTION

The invention is based on the problem of improving the spacer ring in such a manner that the problems arising when aligning a re-lubrication passage with the radial branch of the bolt and the passage in the sleeve, are overcome, and that the transmission of the forces exerted as the inner tab is being pressed over and, if need be, riveted to the sleeve, is nonetheless assured without impairing the function of the sealing ring.

For the roller chain specified above, the solution according to the invention consists in that the sealing ring is substantially made of plastic and unrotatably coupled with the adjacent inner tab; that the spacer in the form of individual metallic inserts, which are approximately equally distributed over the bolt in the circumferential direction, is integrated in the sealing ring; that each insert extends approximately axially through the sealing ring, whereby the overall cross section of all inserts measured in the plane of the ring is small as compared to the surface area of the ring; and that the surface of the sealing ring facing the ball bearing comprises at least one lubrication groove that connects the lubrication channel of the bolt and a lubrication hole of the sleeve with the interior of the ball bearing as a passage for the lubricant, with the lubrication hole of the sleeve being brought to coincide with the lubrication channel of the bolt. Improvements and other embodiments of the invention are also disclosed.

The inserts preferably have a hardness in the order of magnitude of the hardness of the material of the sleeve and the inner tab. In particular, the inserts may have the hardness of steel. The inserts may be integrated in the form of balls or cylinders or also of cubes or square blocks. It is of primary importance that each individual insert is at least as thick in the axial direction (based on the sealing ring) as the sealing ring itself (which may be slightly pressed, if need be). This applies in particular to the area of the sealing ring that is axially disposed between the longitudinal edge of the inner ring of the ball bearing and the inner tab. It has been found in tests that four or more inserts equally distributed in the sealing ring over the radius of the inner ring of the ball bearing are adequate for transmitting the forces occurring during the pressing and, if necessary, riveting process. Provision has to be made for at least three inserts in order to assure that the sealing ring is in a defined position in the course of the pressing and riveting process.

The objective achieved with the invention is that the actual axial connection of force can be secured during the pressing and riveting process without impairing the lubrication connection extending transversely, i.e. radially in relation to such an axial connection of force, because adequate space remains available between the individual metallic inserts of the sealing ring for a lubrication channel or a lubrication groove that forms the connection between the radial branch of the longitudinal channel of the bolt and the interior of the ball bearing. In practical life, the installation may be simplified if the sealing ring comprises a plurality of, for example two diametrally opposed lubrication grooves located on its inner side facing the ball bearing. It needs to be noted in this connection that the individual lubrication groove on the sealing ring, when viewed radially in relation to the axis (of the bolt), is required only in that area of the ring where the spacer inserts are installed, i.e. the lubrication grooves, on their radial way outwards, end on a barrier that prevents any normal loss of lubricant, but assures that lubricant is directly transported from the groove or on the barrier into the interior of the ball bearing.

BRIEF DESCRIPTION OF THE DRAWINGS

A few details of the invention are explained in the following with the help of the schematic representation of one exemplified embodiment. In the drawing.

FIG. 2 is a top view of a sealing ring as defined by the invention; and

FIG. 3 is a section along line III—III in FIG. 2.

DETAILED DESCRIPTION OF THE INVENTION

Figure 1:
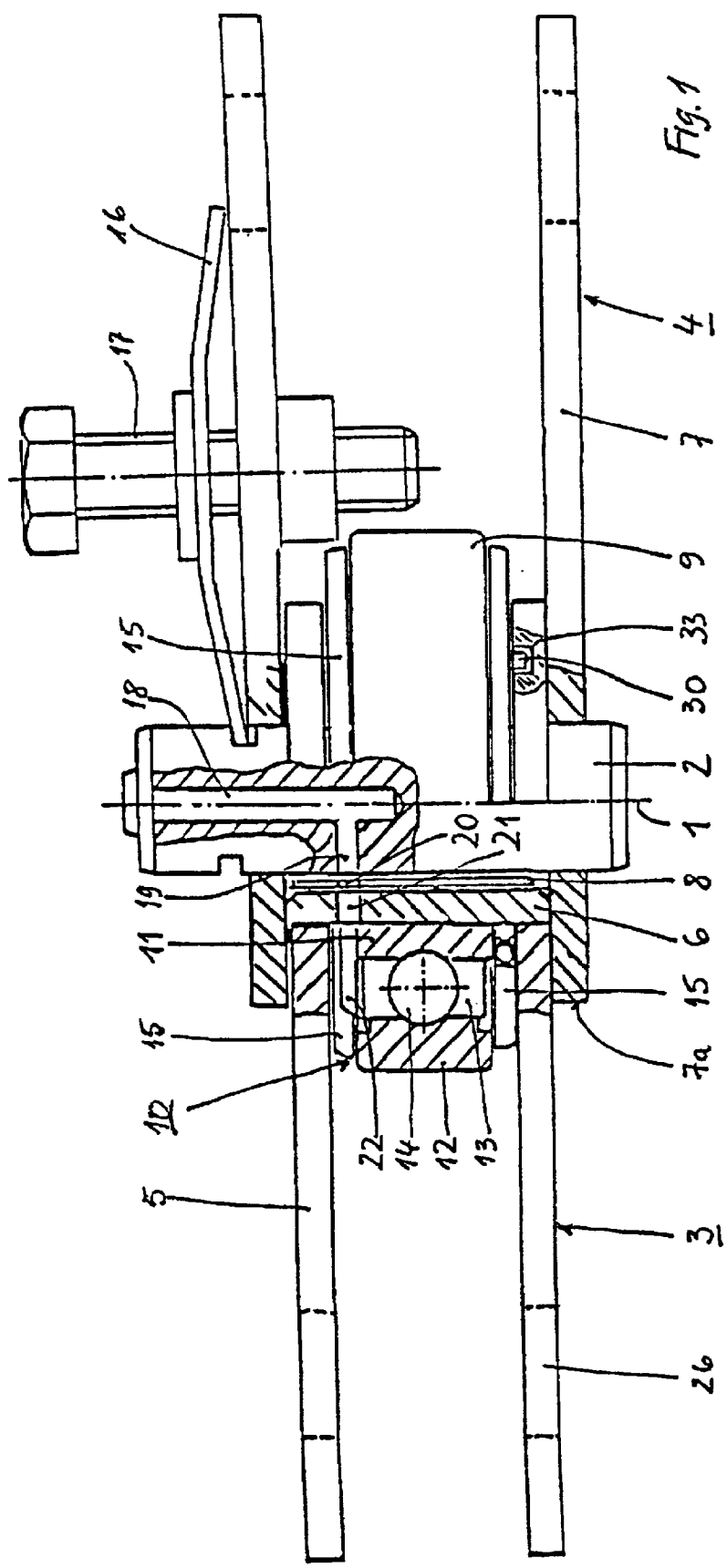
FIG. 1 shows a part of a roller chain by a section perpendicular to the axis of the running roller.

FIG. 1 shows a schematic representation of a part of a roller chain with a section extending perpendicular to the axis of the running roller or longitudinal axis 1 of a bolt 2. The roller chain as a whole is comprised of the inner member denoted by 3 and the outer member denoted by 4. Every inside member 3 is comprised of the two inner tabs 5 as well as the two sleeves 6 connecting the tabs 5 with each other. Each outer member 4 is comprised of the two outer tabs 7 as well as the two bolts 2 connecting the outer tabs 7 with each other. Each of the sleeves 6 is coaxially supported on the associated bolt 2 in a rotatable manner. The required relative rotatability of the bolts 2 and the sleeve 6 is assured, for example by the interconnected coaxial sliding bush 8, which is made of, for example polytetrafluorothene fabric. A coaxial running roller 9 is supported in a rotating manner on the outside of the sleeve 6 in a ball bearing 10, which has to be lubricated from the outside. The free ends 7a of the outer tabs 7 extend distinctly beyond the bolts 2 and partly enclose between themselves the area of the inner member 3, in which provision is made according to EP 0 400 375 (see above) for a re-lubrication channel leading to the ball bearing 10.

The inner ring 11 of the ball bearing 10 is unrotatably connected with the sleeve 6. The outer ring 12 of the ball bearing 10 receives the running roller 9 or is forming the latter. The interior 13 (between the inner ring 11 and the outer ring 12) of the ball bearing contains the balls 14 and otherwise substantially lubricant. The interior 13 of the ball bearing is covered with the help of the sealing rings 15 for the purpose of preventing the lubricant from leaking out, among other things.

A clearance required between the outer tabs 7 and the inner tabs 5 on the circumference of the bolt for free mobility is absorbed with the help of a spring leaf 16. Needle or screw plate members (not drawn) for retaining an edge of the material web are secured on the roller chain, preferably on the outer tabs 7 with the help of a device symbolized by a screw bolt 17.

During operation, the running roller 9 rotating in the ball bearing 10 is running off on a rail located along the longitudinal edge of the treatment space of the stretching machine. At transport speeds of, for example 50 to 200 m per minute, and with roller diameters of, for example 4 cm, the rotational speed of the running roller 9 is very high, so that excellent lubrication of the ball bearing 10 has to be provided at all times.

For re-lubricating the ball bearing 10, provision is made for a lubrication channel 18 leading axially into the bolt 2. Said channel has at least one radial branch 19. Furthermore, the sleeve 6 contains at least one radial passage hole 21, which has to be aligned with the radial branch 19. If the sleeve 6 is unrotatably connected with the inner tabs 3, and the bolts 2 are unrotatably connected with the outer tabs 4, the radial branches 19 and the radial passage holes 21 are usefully oriented in the course of the set-up stage of the machine in such a manner that they are aligned with each other when the roller chain is stretching in a straight line. The sliding bush 8, of course, contains a passage hole 20 as well, and said hole also has to be aligned with the radial branch 19. In order to simplify such an alignment, the sliding bush 8 can be unrotatably secured on the bolt 2 or on the sleeve 6. An exemplified embodiment of such a sliding bush 8 is described in DE 195 37 426 C2.

According to the invention, the path taken by the lubricant starts in the axial lubrication channel 18 and leads via the radial branch 19 and the holes 20 and 21 through a lubrication groove 22 (which is a lubrication channel as well) of the sealing ring 15, and into the interior 13 of the ball bearing. The sealing ring 15 is explained in greater detail with the help of FIGS. 2 and 3. In the exemplified embodiment, said sealing ring contains a ring area 23 that is axially disposed in front of or above the longitudinal edge of the inner ring 11 and the four through-extending bores 24, which each contain a ball 25, whereby the ball diameter has to be at least equal to the thickness of the ring area 23 measured in the axial direction. The bores 24 have to be at least approximately equally distributed in the circumferential direction of the bolt. Therefore, when the inner tabs 5 with their bores 26 are pressed onto the sleeves 6 and riveted with force to the ball bearing 10, said force is directly transmitted via the balls 25 to the inner ring 11 of the ball bearing, and the sealing ring 15 is not or not notably stressed in this process. Therefore, as preferred within the scope of the invention, the sealing ring 15 may consist of a plastic suited as a sealant that per se could not absorb the forces occurring in the course of the pressing and riveting process.

Within the area between the two bores 24 with the balls 25 of the sealing ring 15, provision is made according to the invention for the lubrication groove 22. The groove 22 starts radially from its inlet 27 from the passage hole 21 of the sleeve 6, and then leads reversed on the radial barrier 28 located on the outlet 29, directly into the interior 13 of the ball bearing. The outlet 29 is disposed in the (ring) area 30 of the sealing ring 15, which directly covers or seals the interior 13 of the ball bearing. The barrier 28 assures that the injected lubricant is reversed in the axial direction toward the interior 13 of the ball bearing. It is generally adequate if the ball bearing 10 is supplied in this manner from an axial side. If this should not suffice, provision is made for the two branches 19 of the lubrication channel 18 of the bolt 2. The sealing rings 15 of the type as defined by the invention can then be installed on both axial ends of the ball bearing 10.

If the sealing ring 15 were freely movable and rotating around the axis 1 of the roller, the lubrication groove 22 would have to be aligned with the radial branch 19 and the holes 20 and 21. So as to save such an alignment, the sealing ring 15 has to be provided with a cam 31 that excludes such rotational movement. The cam 31 according to FIGS. 2 and 3 is located on the outer surface 32 of the sealing ring 15 that opposes the lubrication groove 22. Said cam is locked, for example in a corresponding opening 33 of the inner tab 5. What is achieved in this way is that the inner tab 5, the sleeve 6 and the sealing ring 15 are connected with each other in an unrotatable manner. This, in turn, makes it possible that the lubrication groove 22 is already aligned with the branch 19 or the holes 20 and 21 in terms of construction.

Described herein is a roller chain that can be employed in a tenter for stretching the width of a web of textile material. The chain comprises bolts with sleeves coaxially supported on said bolts. Rollers supported on balls are coaxially mounted on the sleeves. The ball bearings are axially sealed with the help of sealing rings. The sealing rings have to be designed in such a manner that they transmit mechanical forces in the axial direction and are capable of receiving at the same time a lubrication channel in the radial direction. The sealing rings therefore contain metallic inserts that are equally distributed in separate sites in the circumferencial direction. Said inserts transmit the forces while leaving between each other space for a radial lubrication channel.

List of Reference Symbols
1=Roller axis
2=Bolt
3=Inner member
4=Outer member
5=Inner tab
6=Sleeve
7=Outer tab
7a=Longitudinal end of 7
8=Sliding bush
9=Running roller
10=Ball bearing
11=Inner ring (10)
12=Outer ring (10)
13=Interior of ball bearing
14=Ball
15=Sealing ring
16=Spring leaf
17=Screw bolt
18=Lubrication channel
19=Radial branch of 18
20=Passage hole in 8
21=Passage hole in 6
22=Lubrication groove
23=Ring area (FIG. 2)
24=Bore
25=Ball
26=Bore (3)
27=Inlet (22)
28=Barrier (3)
29=Outlet (22)
30=Ring area above 13
31=Cam
32=Outer surface of sealing ring
33=Opening of 5 for 30
U=Circumferential direction of bolt

What is claimed is:

1. A roller chain for moving a web of textile material in a tenter frame, the roller chain comprising:
   (a) a plurality of inner members each comprising two substantially parallel inner tabs;
   (b) a plurality of outer members each comprising two substantially parallel outer tabs;
   (c) a bolt disposed at each end of said plurality of outer members for coupling said substantially parallel outer tabs together;
   (d) a sleeve disposed at each end of said plurality of inner members for coupling said substantially parallel inner tabs together, said sleeve having a lubrication hole disposed therein, wherein said sleeve is disposed coaxially on said bolt in a rotatable manner, flexibly coupling said inner members and said outer members to each other in an alternating manner;
   (e) a lubrication channel disposed in an interior of said bolt and in fluid communication with a radial branch disposed in said interior of said bolt;
   (f) a running roller comprising:
      (i) an inner ring rigidly coupled to said sleeve;
      (ii) an outer ring coaxial to said inner ring;
      (iii) a plurality of balls disposed between said inner ring and said outer ring; and
      (iv) a sealing ring disposed at each end of said inner ring and said outer ring, forming a ball bearing assembly having an interior, wherein said sealing ring is made substantially of plastic and is rigidly secured to an adjacent inner tab and wherein said sealing ring has a lubrication groove formed in a surface of said sealing ring facing said interior of said ball bearing assembly, said lubrication groove in fluid communication with said lubrication channel, said radial branch and said lubrication hole; and
   (g) a spacing element integrated with said sealing ring, said spacing element comprising a plurality of individual metallic inserts distributed approximately equally in a circumferential orientation on a ring area of said sealing ring, wherein a thickness of said individual metallic inserts is equal to or greater than a thickness of said sealing ring in an axial direction and wherein a total cross section of said individual metallic inserts is smaller than a cross section of said ring area in a plane of said sealing ring;

wherein said spacing element transmits an axial force which is applied when said inner tabs are rigidly pressed onto said sleeve directly to said inner ring, thereby substantially eliminating a stress on said sealing ring.

2. The roller chain according to claim 1, wherein said individual metallic inserts have a hardness on the order of magnitude of a hardness of said inner tabs and said inner ring.

3. The roller chain according to claim 1, further comprising a sliding bush rigidly installed between said bolt and said sleeve, said sliding bush having a passage hole in fluid communication with said lubrication groove, said lubrication hole, said radial branch and said lubrication channel.

4. The roller chain according to claim 1, wherein said individual metallic inserts comprise a plurality of balls.

5. The roller chain according to claim 1, wherein said individual metallic inserts comprise three individual metallic inserts.

6. The roller chain according to claim 1, wherein said individual metallic inserts comprise four individual metallic inserts.

7. The roller chain according to claim 1, further comprising a second lubrication groove diametrically opposed to said lubrication groove.

8. The roller chain according to claim 1, wherein said lubrication groove extends radially with respect to a longitudinal axis of said bolt.

9. The roller chain according to claim 1 wherein said lubrication groove further comprises a reversing barrier for directing an injected lubricant in an axial direction toward said interior of said ball bearing assembly.

10. The roller chain according to claim 1 further comprising a cam disposed between an outer surface of said sealing ring and said adjacent inner tab, wherein said cam rigidly secures said sealing ring to said adjacent inner tab.

11. A roller chain for moving a web of textile material in a tenter frame, the roller chain comprising:

(a) a plurality of inner members each comprising two substantially parallel inner tabs;

(b) a plurality of outer members each comprising two substantially parallel outer tabs;

(c) a bolt disposed at each end of said plurality of outer members for coupling said substantially parallel outer tabs together;

(d) a sleeve disposed at each end of said plurality of inner members for coupling said substantially parallel inner tabs together, said sleeve having a lubrication hole disposed therein, wherein said sleeve is disposed coaxially on said bolt in a rotatable manner, flexibly coupling said inner members and said outer members to each other in an alternating manner;

(e) a lubrication channel disposed in an interior of said bolt and in fluid communication with a radial branch disposed in said interior of said bolt;

(f) a running roller comprising:
 (i) an inner ring rigidly coupled to said sleeve;
 (ii) an outer ring coaxial to said inner ring;
 (iii) a sealing ring disposed at each end of said inner ring and said outer ring, forming a bearing assembly having an interior, wherein said sealing ring is made substantially of plastic and is rigidly secured to an adjacent inner tab and wherein said sealing ring has a lubrication groove formed in a surface of said sealing ring facing said interior of said bearing assembly, said lubrication groove in fluid communication with said lubrication channel, said radial branch and said lubrication hole; and (g) a spacing element integrated with said sealing ring, said spacing element comprising a plurality of individual metallic inserts distributed approximately equally in a circumferential orientation on a ring area of said sealing ring, wherein a thickness of said individual metallic inserts is equal to or greater than a thickness of said sealing ring in an axial direction and wherein a total cross section of said individual metallic inserts is smaller than a cross section of said ring area in a plane of said sealing ring;

wherein said spacing element transmits an axial force which is applied when said inner tabs are rigidly pressed onto said sleeve directly to said inner ring, thereby substantially eliminating a stress on said sealing ring.

\* \* \* \* \*